(No Model.)

P. DUMMER & P. MALMSTRÖM.
MINERAL WATER FOUNTAIN.

No. 261,086. Patented July 11, 1882.

WITNESSES:
Otto Ihufeland
William Miller

INVENTORS
Paul Dummer
Peter Malmström
BY Van Santvoord & Hauff
ATTORNEYS

UNITED STATES PATENT OFFICE.

PAUL DUMMER AND PETER MALMSTRÖM, OF NEW YORK, N. Y., ASSIGNORS TO CARL H. SCHULTZ, OF SAME PLACE.

MINERAL-WATER FOUNTAIN.

SPECIFICATION forming part of Letters Patent No. 261,086, dated July 11, 1882.

Application filed March 28, 1882. (No model.)

*To all whom it may concern:*

Be it known that we, PAUL DUMMER and PETER MALMSTRÖM, both citizens of the United States, residing at New York, in the county and State of New York, have invented new and useful Improvements in Mineral-Water Fountains, of which the following is a specification.

This invention relates to improvements in the means employed for uniting together the flanged sections of a fountain for mineral waters; and it consists essentially in the combination, with the two parts of the fountain having outward-projecting flanges, of an attachable and detachable tie-ring composed of sections, which are recessed to embrace and inclose said flanges and cover the outer edges thereof.

Other features of the invention will be hereinafter described in detail and pointed out in the claims.

This invention is illustrated in the accompanying drawings, in which—

Figure 1:
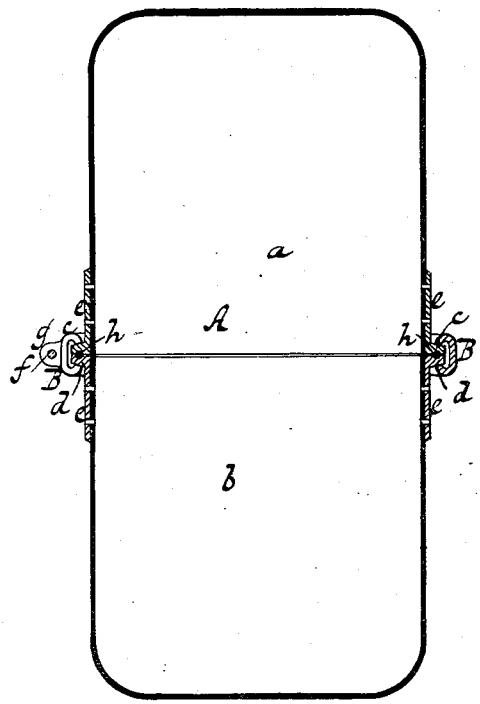
Figure 2:
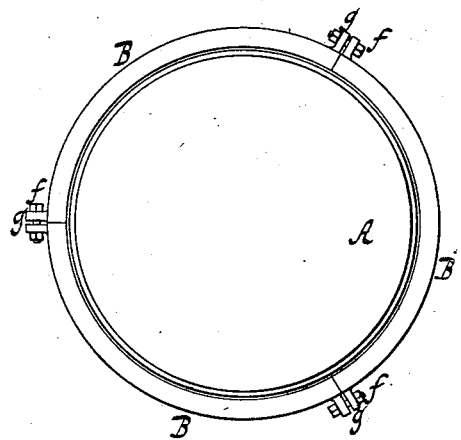

Figure 1 is a vertical section through a fountain. Fig. 2 is a plan or top view.

Similar letters indicate corresponding parts.

In the drawings, the letter A designates the fountain, composed of two sections, $a$ and $b$, the open ends of both of which are provided with outwardly-projecting annular flanges $c$ $d$. In the fountain shown in the drawings a ring, $e$, is riveted to each of the sections $a$ $b$, and from these rings the flanges $c$ and $d$ project; but they may be also bent up from the body of the sections $a$ and $b$ and made in one piece with them. To join the two sections $a$ and $b$ of the fountain together in such a manner that they will be gas and water tight, a sectional recessed tie-ring, B, is placed around the flanges $c$ $d$, the segmental sections composing said ring being drawn together by bolts $f$, which pass through the lugs $g$, projecting laterally from the sections of the ring, Fig. 2, and each of said segmental sections being recessed, so that when the ring is in place the sections embrace and inclose the flanges $c$ and $d$ and cover the outer edges thereof. The edges of the recesses in the ring are beveled to correspond to a similar bevel on the outer faces of the flanges $c$ $d$, so that when the sections of said tie-ring are drawn together by the bolts $f$ the inner faces of the flanges are pressed close together, thereby forming the tight joint required. To add to the security of joint thus formed, a gasket, $h$, of rubber or similar material, may be placed between the sections, as shown in Fig. 1.

By our invention the sections of a mineral-water fountain may be quickly and easily taken apart to replace a broken glass lining, or for any other purpose, and as quickly united again, a tight joint being always provided.

Fountains have heretofore been made of two parts having flanges at the edge of each section, which are clamped together by two separate rings with the flanges between them, said rings being confined in place by screws passing through the rings and the flanges on the two sections composing the fountain; but such is not our invention.

What we claim as new, and desire to secure by Letters Patent, is—

1. In a fountain for mineral waters, the combination, with the two sections $a$ and $b$, provided with flanges $c$ and $d$, of the attachable and detachable tie-ring B, composed of sections which are recessed to embrace and inclose the flanges and cover their outer edges, and fastening devices for connecting the sections of the tie-ring, substantially as and for purposes set forth.

2. The combination of the two sections $a$ $b$, provided with flanges $c$ $d$, the upper faces of said flanges being beveled, with a sectional recessed tie-ring, B, the recess in said ring being of such a shape that it will draw the sections $a$ $b$ of the fountain toward each other as the said tie-ring is drawn together by the bolts $f$, substantially as hereinbefore described.

In testimony whereof we have hereunto set set our hands and seals in the presence of two subscribing witnesses.

PAUL DUMMER. [L. S.]
PETER MALMSTRÖM. [L. S.]

Witnesses:
E. F. KASTENHUBER,
J. HERMANN WAHLERS.